United States Patent [19]
Kim et al.

[11] Patent Number: 5,878,136
[45] Date of Patent: Mar. 2, 1999

[54] ENCRYPTION KEY CONTROL SYSTEM FOR MAIL PROCESSING SYSTEM HAVING DATA CENTER VERIFICATION

[75] Inventors: Hyung-Kun Paul Kim, Wilton; Robert A. Cordery, Danbury; Leon A. Pintsov, West Hartford, all of Conn.

[73] Assignee: Pitney Bowes Inc., Stamford, Conn.

[21] Appl. No.: 133,416

[22] Filed: Oct. 8, 1993

[51] Int. Cl.$^6$ ................................................ H04L 9/00
[52] U.S. Cl. .............................. 380/21; 380/51; 380/55; 705/401; 705/405
[58] Field of Search .................................. 380/21, 23, 25, 380/51, 55; 364/464.02; 705/401–411

[56] References Cited

U.S. PATENT DOCUMENTS

| | | | |
|---|---|---|---|
| 4,097,093 | 6/1978 | Shelby et al. | 305/22 |
| 4,097,923 | 6/1978 | Eckert, Jr. et al. | 364/900 |
| 4,376,299 | 3/1983 | Rivest | 380/51 |
| 4,649,266 | 3/1987 | Eckert | 235/432 |
| 4,725,718 | 2/1988 | Sansone et al. | 235/495 |
| 4,743,747 | 5/1988 | Fougere et al. | 235/494 |
| 4,757,537 | 7/1988 | Edelmann et al. | 380/51 |
| 4,775,246 | 10/1988 | Edelmann et al. | 380/23 |
| 4,807,139 | 2/1989 | Liechti | 364/464.02 |
| 4,873,645 | 10/1989 | Hunter et al. | 364/464.02 |
| 5,008,827 | 4/1991 | Sansone et al. | 364/464.02 |
| 5,142,577 | 8/1992 | Pastor | 380/21 |
| 5,170,044 | 12/1992 | Pastor | 235/454 |
| 5,202,922 | 4/1993 | Iijima | 380/21 X |
| 5,243,654 | 9/1993 | Hunter | 380/51 |

FOREIGN PATENT DOCUMENTS

| | | | |
|---|---|---|---|
| 0376573 | 7/1990 | European Pat. Off. | 364/464.02 |
| 225210 | 1/1992 | United Kingdom | G07B 17/00 |

Primary Examiner—Bernarr Earl Gregory
Attorney, Agent, or Firm—Charles R. Malandra, Jr.; David E. Pitchenik; Melvin J. Scolnick

[57] ABSTRACT

A key control system comprises the generation of a first set of keys which are then used for a plurality of respective postage meters. The keys are then related to a respective meter in accordance with a map or algorithm. The keys may be changed by entering the second key via an encryption using the first key.

7 Claims, 7 Drawing Sheets

FIG. 2A

| PED ID | PS-DES POINTER | PS-DES (JULIAN DATE, POSTAGE, PIECE COUNT, PED ID) | VENDOR ECODE | ERROR DETECTION |
|---|---|---|---|---|
| 1234567 | 89 | 0123456789012345789 | 012 | 2 |

FIG. 2B

| PED ID | PS-DES (JULIAN DATE, POSTAGE, PIECE COUNT, PED ID) | VENDOR ECODE | ERROR DETECTION |
|---|---|---|---|
| 1234567 | 0123456789012345789 | 012 | 9 |

FIG. 3A

| PED ID | PS-DES POINTER | JULIAN DATE | POSTAGE | PIECE COUNT | PS ECODE | VENDOR ECODE | ERROR DETECTION |
|---|---|---|---|---|---|---|---|
| 1234567 | 89 | 01 | .0290 | 678901 | 234 | 567 | 5 |

FIG. 3B

| PED ID | JULIAN DATE | POSTAGE | PIECE COUNT | PS ECODE | VENDOR ECODE | ERROR DETECTION |
|---|---|---|---|---|---|---|
| 1234567 | 01 | .0290 | 678901 | 234 | 567 | 2 |

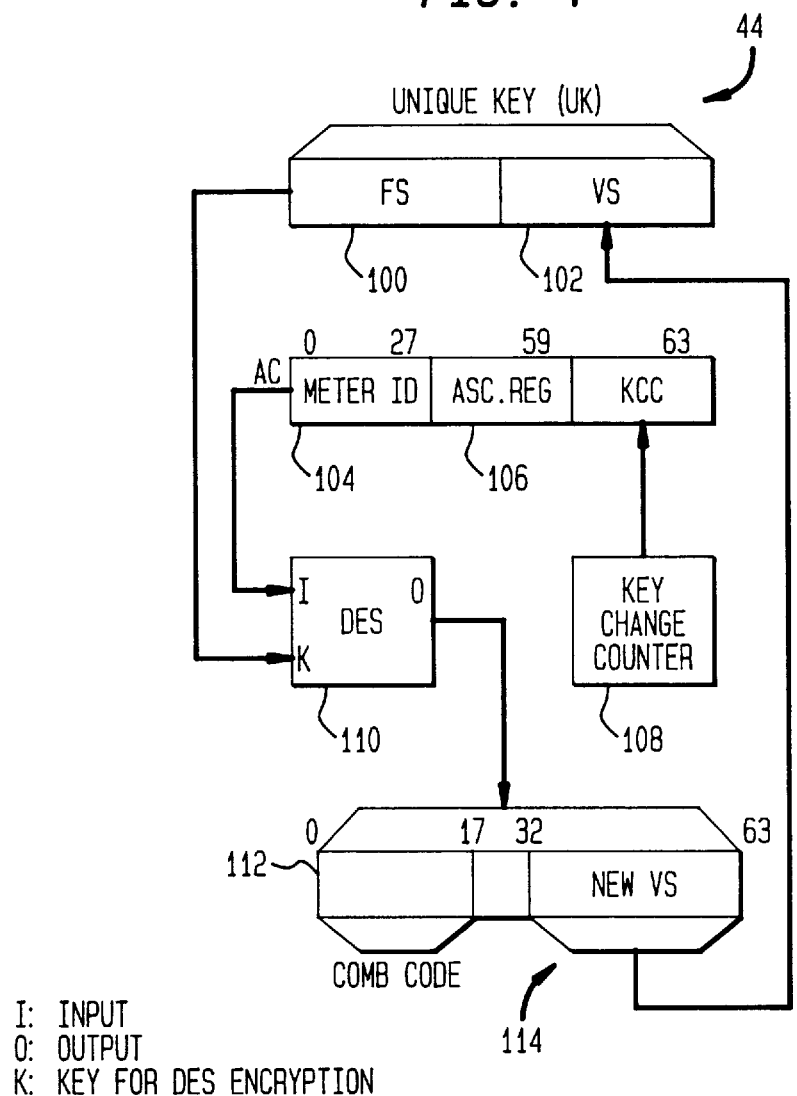

FLOW CHART FOR KEY CHANGE AT METER

DATA CENTER FLOW CHART FOR KEY CHANGE

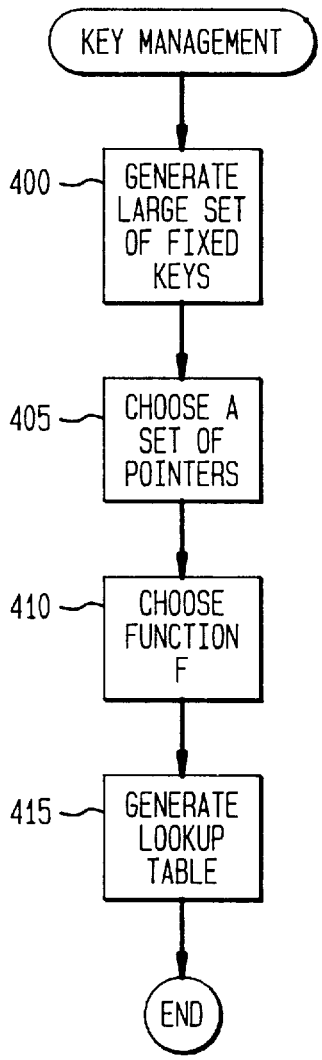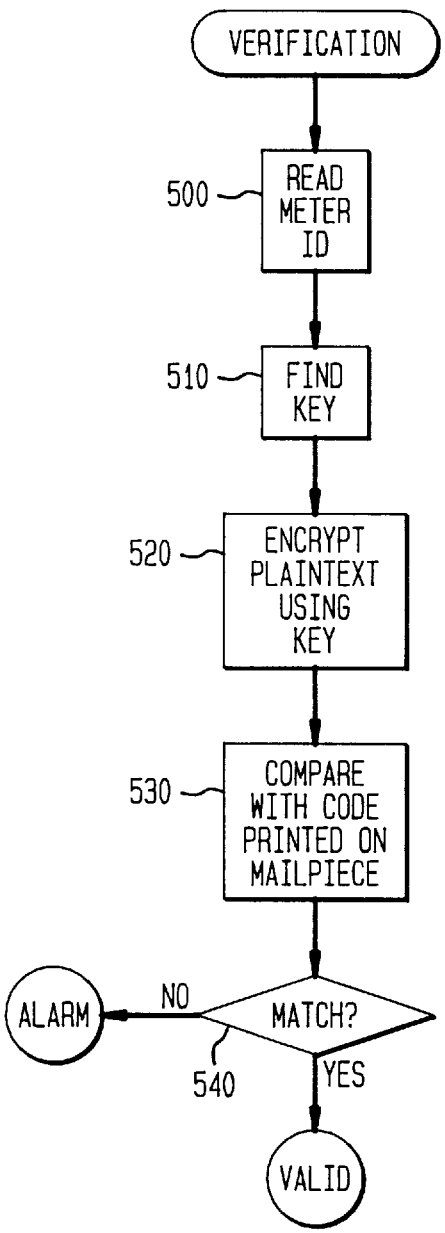

ENCRYPTION KEY CONTROL SYSTEM FOR MAIL PROCESSING SYSTEM HAVING DATA CENTER VERIFICATION

FIELD OF THE INVENTION

The invention relates to mail processing systems and more particularly to security of postage metering systems.

BACKGROUND OF THE INVENTION

Recent advances in digital printing technology have made it possible to implement digital, i.e., bit map addressable, printing for the purpose of evidencing payment of postage by a postage-meter-like device. Where necessary in order to distinguish such postage-meter-like devices from the typical postage meter, such devices will be called herein Postage Evidencing Devices or PED's. In such devices, the printer may be a typical stand-alone printer. The computer driven printer of such a PED can print the postal indicia in a desired location on the face of a mail piece. Further, as used herein the postal indicia will be defined as the Postal Revenue Block or PRB. The PRB typically contains data such as the postage value, a unique PED identification number, the date and in some applications the name of the place where the mail is originating. It must be noted, however, that the term postage meter as used herein will be understood to cover the various types of postage accounting systems including such PED's and is not to be limited by the type of printer used.

From the Post Office's point of view, it will be appreciated that a serious problem associated with PED's is that the digital printing makes it fairly easy to counterfeit the PRB since any suitable computer and printer may be used to generate multiple images. In fact, many of these new PED systems may be using printers that are able to print legitimate indicias which are indistinguishable from those printed by others that are printed without any attempt to purchase postage.

In order to validate a mailpiece, that is to assure that accounting for the postage amount printed on a mailpiece has been properly done, it is known that one may include as a part of the franking an encrypted number such that, for instance, the value of the franking may be determined from the encryption to learn whether the value as printed on the mailpiece is correct. See, for example, U.S. Pat. Nos. 4,757,537 and 4,775,246 to Edelmann et al. as well as U.S. Pat. No. 4,649,266 to Eckert. It is also known to authenticate a mailpiece by including the address as a further part of the encryption as described in U.S. Pat. No. 4,725,718 to Sansone et al and U.S. Pat. No. 4,743,747 to Fougere et al.

U.S. Pat. No. 5,170,044 to Pastor describes a system wherein include a binary array and the actual arrays of pixels are scanned in order to identify the provider of the mailpiece and to recover other encrypted plaintext information. U.S. Pat. No. 5,142,577 to Pastor describes various alternatives to the DES encoding for encrypting a message and for comparing the decrypted postal information to the plaintext information on the mailpiece.

U.K. 2,251,210A to Gilham describes a meter that contains an electronic calendar to inhibit operation of the franking machine on a periodic basis to ensure that the user conveys accounting information to the postal authorities. U.S. Pat. No. 5,008,827 to Sansone et al. describes a system for updating rates and regulation parameters at each meter via a communication network between the meter and a data center. While the meter is on-line status registers in the meter are checked and an alarm condition raised if an anomaly is detected.

It will be appreciated that in order to verify the information in the PRB using the encrypted message, the verifier must first be able to obtain the key used by the particular meter. In trying to deal with mailing systems which may incorporate such encryption systems, it must be recognized that the meter population is large and subject to constant fluctuation as meters are added and removed from service. If the same key were to be used for all meters, the key distribution is simple but the system is not secure. Once the code is broken by anyone, the key may be made available to others using the system and the entire operation is compromised. However, if separate keys are used respectively for each meter then key management potentially becomes extremely difficult considering the fluctuations in such a large population.

SUMMARY OF THE INVENTION

It is therefore an object of the invention to provide a key management system which provides the necessary security and yet which will allow ease of key management in a very large system.

It is a further object of the invention to provide a method for keeping track of a plurality of keys in a large mailing system.

It is another object to provide a method for easily changing the keys for each meter in a manner that provides security and system wide tracking of the key changes.

The above and other objects are attained in a method of key management for controlling encryption keys used in encrypting information to be printed on a mailpiece for validating the mailpiece, the method comprising the steps of generating a predetermined number of keys, assigning one of said keys to a particular postage meter by means of a determined relationship associated with the postage meter, said relationship being derived as a predetermined function corresponding to the particular postage meter, and installing the assigned key in the particular postage meter.

In a preferred embodiment, the method in accordance with the invention further comprises the steps of generating a predetermined number of new keys, assigning one of said new keys to a selected postage meter, providing an encryption of the assigned new key to the postage meter using the previously assigned key, and decrypting the encryption of the new key in said postage meter for obtaining the assigned new key and installing the new key in the postage meter.

In another aspect of the invention there is provided a method for changing keys used in encrypting information to be printed on a mailpiece for validating the mailpiece comprising the steps of providing in a postage meter and a security center a current key comprising a fixed seed and a variable seed, generating in the postage meter an access code and encrypting the access code using the current key to provide an encryption output, deriving a meter combination and a new variable seed from the encryption output, communicating the access code to the security center, generating a security center combination by encrypting the communicated access number using the current key, receiving at the postage meter and inputting the security center combination generated at the security center, comparing the meter combination and the security center combination in the postage meter and if there is a match, replacing the variable seed in the current key with the new variable seed to use as a new key at both the postage meter and the security center.

BRIEF DESCRIPTION OF THE DRAWINGS

FIGS. 2a and 2b illustrates the information which may be printed in a first embodiment of a PRB in accordance with the invention.

FIGS. 3a and 3b illustrate an alternative to the information shown in FIGS. 2a and 2b.

FIG. 4 is a functional diagram of a key change module.

FIG. 7 is a flow chart of the operation for providing keys in accordance with another aspect of the invention.

FIG. 8 is a flow chart of the verification process.

DESCRIPTION OF THE PREFERRED EMBODIMENT

Figure 1:
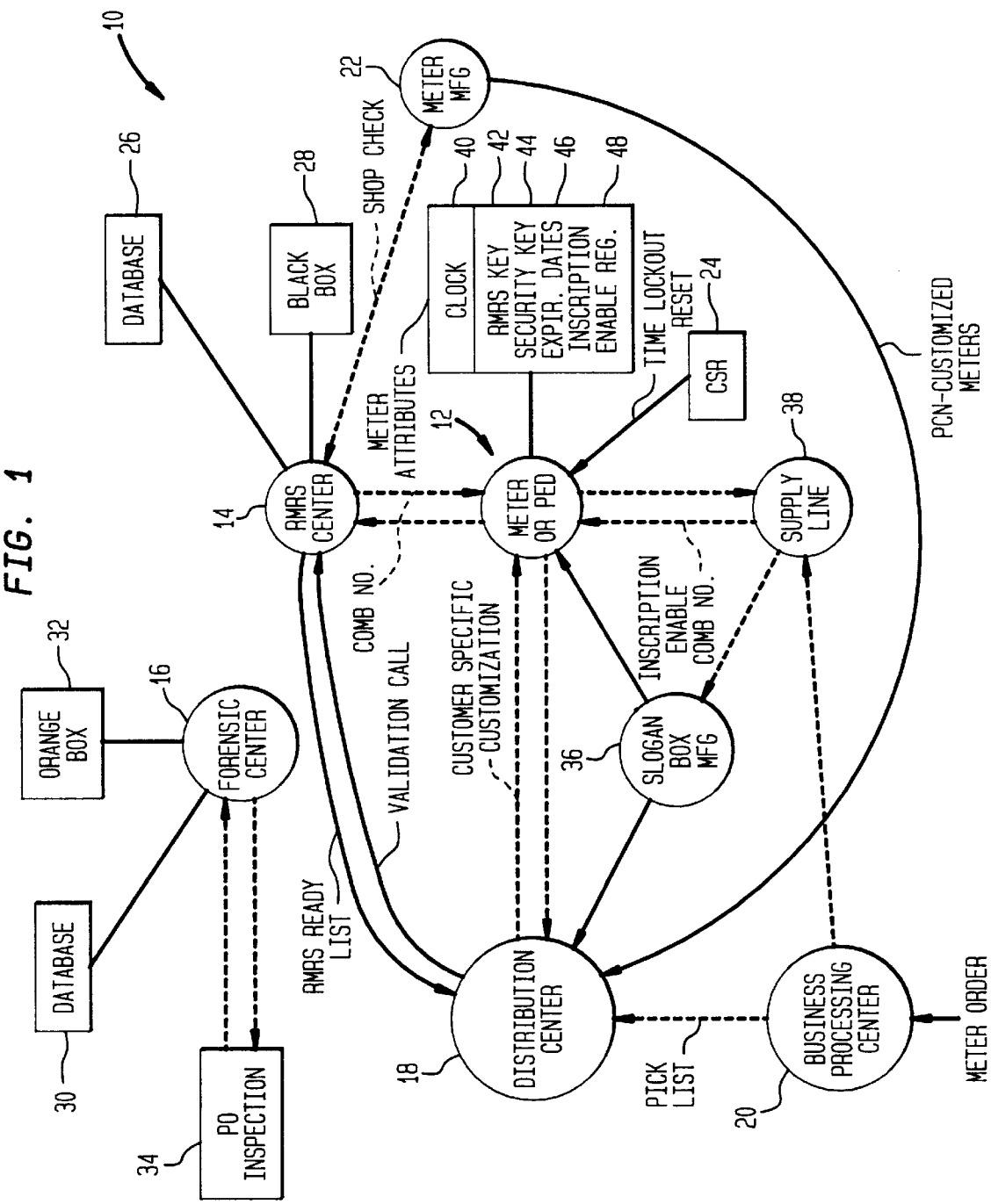
FIG. 1. is a schematic view of a system which may be used in accordance with the invention.

In FIG. 1, there is shown generally at 10 an overall system in accordance with the invention. In the embodiment illustrated, the system comprises a meter or PED 12 interacting with a plurality of different centers. A first center is a well-known meter-fund resetting center 14 of a type described, for example, in U.S. Pat. No. 4,097,923 which is suitable for remotely adding funds to the meter to enable it to continue the operation of dispensing value bearing indicia. In accordance with the invention there is also established a security or forensic center 16 which may of course be physically located at the resetting center 14 but is shown here separately for ease of understanding. Alternatively such a security or forensic center could be an entirely separate facility maintained by the Postal Authorities, for instance, or two separate facilities may be maintained in order to provide levels of security, if desired. The dashed lines in FIG. 1 indicate telecommunication between the meter 12 and the resetting center 14 (and/or forensic center 16).

Typically there may be an associated meter distribution center 18 which is utilized to simplify the logistics of placing meters with respective users. Similarly, a business processing center 20 is utilized for the purpose of processing orders for meters and for administration of the various tasks relating to the meter population as a whole.

The meter manufacturer indicated at 22 provides customized meters or PED's to the distribution center 18 after establishing operability with shop checks between the manufacturer and the resetting center 14 and forensic center 16. The meter or PED is unlocked at the user's facility by a customer service representative indicated here by the box 24.

At the resetting center 14 a database 26 relating to meters and meter transactions is maintained. The resetting combinations are generated by a secured apparatus labelled here as the BLACK BOX 28. The details of such a resetting arrangement are found in U.S. Pat. No. 4,097,923, herewith specifically incorporated by reference herein, and will not be further described here.

Database 30 and a secured encryption generating apparatus, designated here as ORANGE BOX 32 are maintained at the security center 16. The orange box preferably uses the DES standard encryption techniques to provide a coded output based on the keys and other information in the message string provided to it. It will be understood that other encryption arrangements are known and the invention is not limited to the specific embodiment using DES encryption. The security or forensic center, wherever maintained, is preferably connected by telecommunication with any Post Office inspection station, one of which is indicated here at 34.

Further details are to be found in U.S. application Ser. No. 08/133,427, (Atty. Docket No. E-111) filed on even date herewith assigned to the assignee of the instant application and specifically incorporated by reference herein, now U.S. Pat. No. 5,390,251.

Returning now to the meter 12, as illustrated, the meter includes a clock 40 which is secure and which is used to provide a calendar function programmed by the manufacturer and not available to the user. Such clocks are well known and may be implemented in computer routines or in dedicated chips which provide programmable calendar outputs. Also stored within the registers of the meter 12 are a fund resetting key 42, security key 44, expiration dates 46 and preferably, an inscription enable flag 48. Preferably, in order to prevent the breaking of the encrypted messages to be printed by the postage meter, the security key 44 is changed at predetermined intervals as discussed below.

The security key 44 is used in conjunction with a DES encrypter in the meter 12 to provide an encryption of certain information in the PRB for each printing of the PRB on a mailpiece. At each printing operation, the entire encrypted message may be printed on the mailpiece. However, preferably the cipher hereafter referred to herein as an ECODE is a truncated ciphertext produced by DES encryption of the message based on postage information available to the meter. Verification at the security center consists of verifying that the encrypted information is consistent with the ECODE.

If automatic checking of the ECODE is desired, both the ECODE and the plaintext must be machine readable. A typical length of plaintext information is, for example only and not by way of limitation, the sum of the meter ID (typically 7 digits), a date (preferably 2 digits, suitably the last 2 of the number of days from a predetermined starting date such as Jan. 1), the postage amount (4 digits), and the piece count for a typical total of 16 digits. Reading devices for lifting the information either from a bar-code on the mailpiece or as OCR are well-known and will not be further discussed.

A DES block is conventionally 64-bits long, or approximately 20 decimal digits. A cipher block is an encryption of 64 bits of data. It will be appreciated that other information may be selected and that less than the information provided here may be encrypted in other embodiments of the invention. It is however important to note that the information to be encrypted must be identical to that used in verification. To this end the plaintext message may include data which indicates the particular information which is encrypted. This may take the form of an additional character, additional bar coding or a marking on the mailpiece as may be found desirable.

If desired, a second ECODE could be printed using a DES key from a set of keys PS-DES known to the Postal Service. Alternatively the Postal Service could elect to manage its own set of keys as described in connection with the key management system described below.

In a first embodiment, as shown in FIGS. 2a and 2b, the plain text is encrypted using one of the keys from PS-DES. The Postal Service uses the same key from the set PS-DES to verify the message. A higher level of security is provided by the second ECODE.

In a second embodiment, two ECODES are generated and printed on the mailpiece, one using a PS-DES key provided by the Post Service and the other using a Vendor-DES key provided, for example, by the manufacturer or security center. The Postal Service can then verify the message using its own code generating and key management system while the vendor can separately verify the validity of the message using the ECODE generated using its separate key system. FIGS. 3a and 3b show the format of this second embodiment.

In order to provide for reasonable management of the keys in any of these systems, one embodiment of a method of key management in accordance with the invention is seen in FIG. 4 which illustrates a suitable key change module, showing the relationship of registers. As illustrated, the unique security key 44 comprises a fixed seed (FS) 100 and a variable seed (VS) 102, preferably for DES encryption 32 bits each. The meter generates an access code AC, suitably formatted for instance with meter number 104, ascending register value 106, and a number from a key change counter 108. This access code is encrypted at DES encrypter 110 using the current key. Suitably the 18 most significant bits shown here at 112 may be kept for comparison with a similarly generated combination code while 32 bits shown at 114 may suitably used as the variable portion of the unique key.

Figure 5:
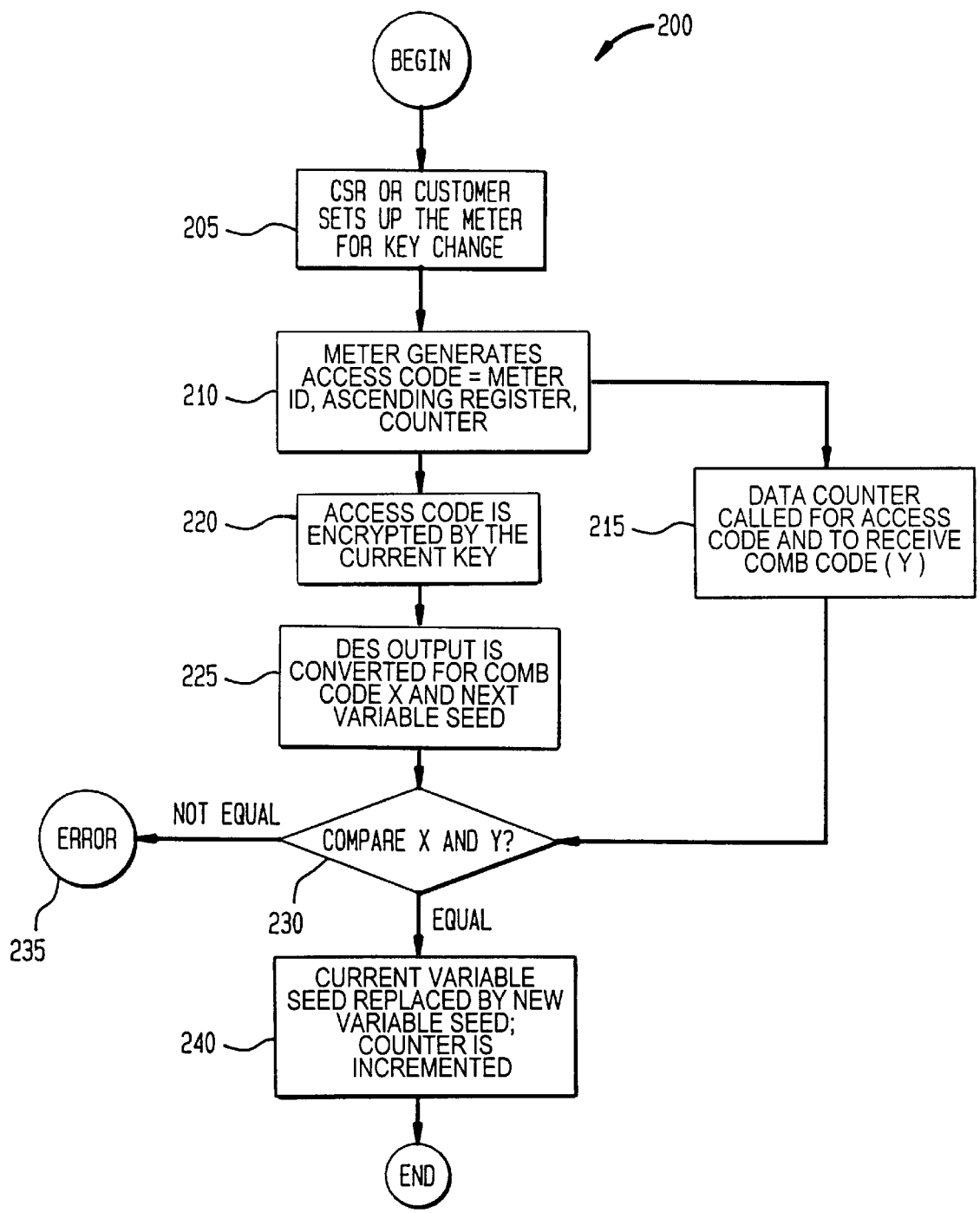
FIG. 5 is a flow chart for key change in the meter.

FIG. 5 is a flow chart of the key change at the meter. At the start of the routine indicated at 200 the Customer Service Representative or the customer himself sets up the meter for the key change, suitably by pressing a function key (not shown), block 205. The meter generates an access code as described above, block 210. The security center is called to receive AC from the meter whereupon the center generates and sends to the meter a combination code (Y), block 215. The AC in the meter is encrypted in the meter using its current key, block 220, and the output is converted to provide the expected combination code X and the next variable seed, block 225. When the code Y is received from the security center, it is compared at decision block 230 with the internally generated code X and if they are not equal an error signal or an alarm is generated, block 235. If they are equal, the variable seed is replaced by the new variable seed, block 240, and the routine ends.

Figure 6:
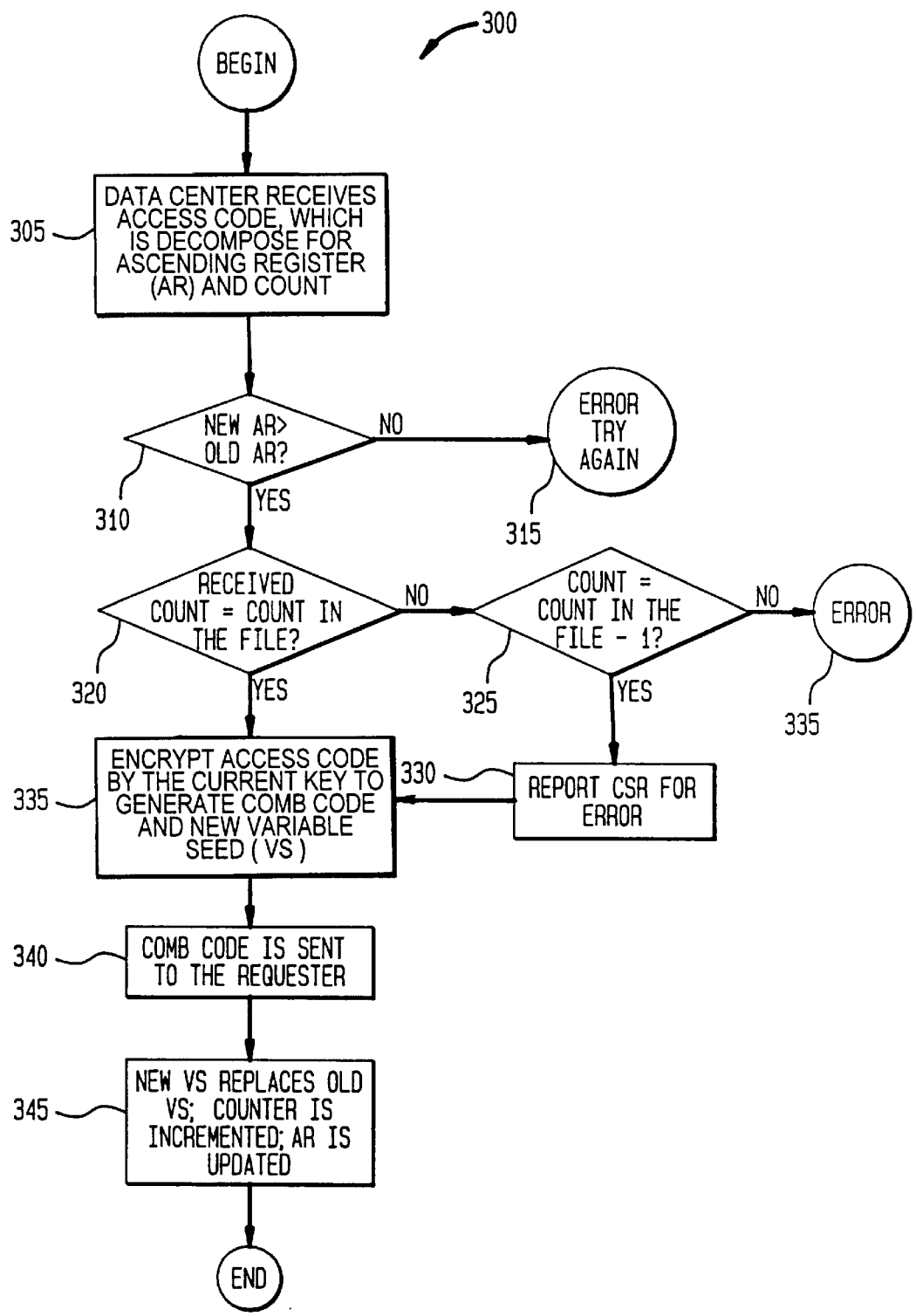
FIG. 6 is a flow chart for the key change at the data center.

FIG. 6 is a flow chart illustrating the key change operation at the security center. In this routine illustrated generally at 300, block 305 is the security center receipt of the telephonic communication illustrated at block 215 of FIG. 5. At receipt, the Access code is decomposed to obtain the value of the ascending register and the count. If the security center is not at the fund-resetting center, a communication with the resetting center can determine whether the new ascending register value is greater than the previous value, block 310. If NO then an alarm or error signal is generated, block 315. The count is then checked, block 320, and if it doesn't match the count in the file, a check is made at block 325 to determine if it is only one less, indicating that the previous key change had not been entered, and a report to the Service Representative is made, block 330. Otherwise an error is reported, block 335. The AC is encrypted using the current key to generate the combination code and the new variable seed, block 335, and the combination code sent to the requester, block 340. At the security center, the new variable seed replaces the the old one and the counter is incremented, block 345. The updated ascending register information can be provided to the fund-resetting center if desired and the routine ends.

Preferably, the meter will be locked if the meter is not inspected and/or the key change is not made prior to a predetermined date.

FIG. 7 shows an alternative arrangement for controlling the keys. First a large fixed set of keys is generated, block 400. As seen below, the system S in accordance with the invention comprises a set of pointers $\{p\}$, a set of keys indexed by the pointer $\{key_p\}$ and a map F or generating algorithm from the set of meter ID's $\{M\}$ to the set of pointers. Thus:

$$S=(F,\{p\},key_{p\}})$$

is the system $$F:\{M\}\rightarrow\{p\}$$

and $$F(M)=F(\text{meter ID})=p$$

finds the pointer to the key for a given meter M.

Thus, returning to FIG. 7, as an example, the set of pointers $\{p\}$ which may be the integers from 1 to 1000, are chosen, block 405. The function F may be then chosen as, again for example, the DES encryption of meter ID using a DES key K, preferably truncated to three digits, block 410 and a look-up table is generated, block 415. It will be understood that other functional relationships may be chosen. For the greatest security, it will be appreciated that the relationship between a pointer p and the corresponding key should not be easily discoverable nor should the relationship between the pointer and the meter ID. It will also be understood that the function F should be maintained in secret.

FIG. 8 shows the verification process using the foregoing key management system. In order to verify a mailpiece, the meter number printed on the mailpiece is read, block 500. The key to be used, $key_{F(M)}$, is then found by lookup table or algorithm F from the given meter number, block 510. The identical plain text information used to create the E-code is now encrypted at the security center using $key_{F(M)}$, block 520, and the result is compared with the code printed on the mailpiece, block 530. If there is a match at decision block 540, the mailpiece is valid. If not the NO branch will trigger an alarm.

Returning for the moment to FIG. 2a and FIG. 3a, the Postal Service is able in these embodiments to obtain the PS-DES pointer directly from the indicia without using the process shown in FIG. 8. In the cases illustrated in FIGS. 2b and 3b, the DES pointer is obtained by using a predetermined algorithm applied to the information printed in the PED ID as described in connection with FIG. 8.

Figure 9:
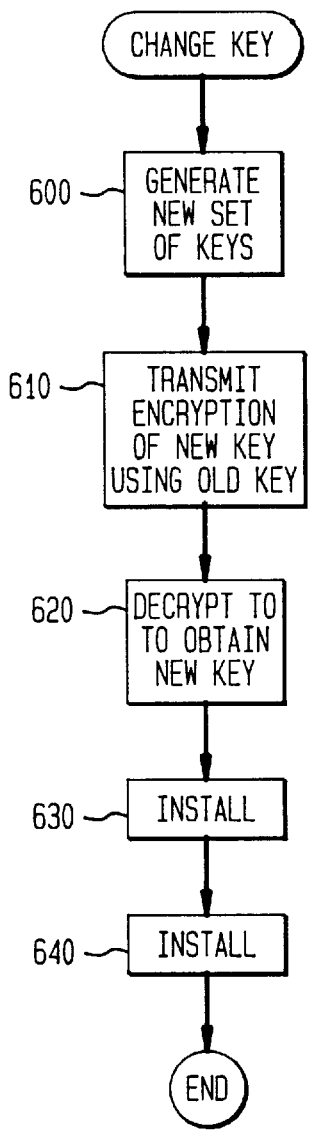
FIG. 9 illustrates the method for changing keys in accordance with the invention.

As has been brought out previously, there is a need to change the keys in the meter at regular intervals in order to insure that the security is maintained. FIG. 9 shows a preferred routine for updating the keys. In order to update the keys from a system $S^1=(F^1,\{p^1\},\{key_p^1\})$ to a system $S^2=(F^2,\{p^2\},\{key_p^2\})$ a new set of keys is generated, block 600, using a new function F (for example, the key for the DES encryption algorithm may be changed from $K^1$ to $K^2$). At the next scheduled update or at any selected time desired, for example, meter inspection or meter refunding, or at the next modem connection to the meter, the meter is sent, at block 610, an encrypted message $$E=\text{encrypt}^1\ [key^2{}_{F^2(m)}]\text{using }key^1{}_{F^1(M)}.$$

In the meter, E is decrypted, block 620, to obtain the new key and it is installed, block 630, and, if desired, the new key is verified, block 640.

It will be understood that if, for example, the inspection period is the period chosen for changing the key, then system $S^1$ is valid for one full inspection period following the generation of the set $S^2$. If on the other hand, the inspection period, for example, is 6-months and the keys are updated with a longer period, then the verifier will need to hold two systems, S(present) and S(previous) and verify the mailpiece with both. It will be appreciated that with the system in accordance with the invention, the key lookup and DES encryption may be implemented to be fast and effective enough to be performed on-line.

What is claimed is:

1. A method for key management for controlling the keys used in encoding information to be printed on a mailpiece for validating the mailpiece comprising the steps of generating a predetermined number of keys, assigning one of said keys to a particular postage meter by means of a determined relationship associated with the postage meter, said relationship being derived as a predetermined function corresponding to the particular postage meter, and installing the assigned key in the particular postage meter.

2. The method of claim 1 further comprising the steps of generating a predetermined number of new keys, assigning a new key to the postage meter, providing an encryption of the assigned new key to the postage meter using the previously assigned key, and decrypting the encryption of the new key in said postage meter for installing the new key in the postage meter.

3. A method for key management for controlling the keys used in encoding information to be printed on a mailpiece for validating the mailpiece comprising the steps of generating a predetermined number of keys, assigning one of said keys to a particular postage meter by means of a pointer associated with the postage meter, said pointer being derived as a predetermined function corresponding to the particular postage meter, and installing the assigned key in the particular postage meter.

4. The method of claim 3 further comprising the steps of generating a predetermined number of new keys, assigning a new key to the postage meter, providing an encryption of the assigned new key to the postage meter using the previously assigned key, and decrypting the encryption of the new key in said postage meter for installing the new key in the postage meter.

5. In a postage meter, a method for changing keys used in encoding information to be printed on a mailpiece for validating the mailpiece comprising the steps of providing a current key comprising a fixed seed and a variable seed, generating an access code and encrypting the access code using the current key to provide an encryption output, deriving a meter combination and a new variable seed from the encryption output, communicating the access code to a security center, receiving and inputting a security center combination generated at the security center, comparing the meter combination and the security center combination and if there is a match, replacing the variable seed in the current key with the new variable seed to use as a new key.

6. The method of claim 5 wherein the access code includes a number representative of the count of the times that the key has been changed.

7. A method for changing keys used in encoding information to be printed on a mailpiece for validating the mailpiece comprising the steps of providing in a postage meter and a security center a current key comprising a fixed seed and a variable seed, generating in the postage meter an access code and encrypting the access code using the current key to provide an encryption output, deriving a meter combination and a new variable seed from the encryption output, communicating the access code to the security center, generating a security center combination by encrypting the communicated access number using the current key, receiving at the postage meter and inputting the security center combination generated at the security center, comparing the meter combination and the security center combination in the postage meter and if there is a match, replacing the variable seed in the current key with the new variable seed to use as a new key at both the postage meter and the security center.

* * * * *